(12) United States Patent
Long

(10) Patent No.: US 9,021,915 B2
(45) Date of Patent: May 5, 2015

(54) GEAR TRANSMISSION MECHANISM AND ROBOT ARM CONNECTING STRUCTURE USING THE SAME

(71) Applicants: Hong Fu Jin Precision Industry (ShenZhen) Co., Ltd., Shenzhen (CN); Hon Hai Precision Industry Co., Ltd., New Taipei (TW)

(72) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 121 days.

(21) Appl. No.: 13/848,229

(22) Filed: Mar. 21, 2013

(65) Prior Publication Data
US 2014/0013884 A1    Jan. 16, 2014

(30) Foreign Application Priority Data

Jul. 16, 2012 (CN) .......................... 2012 1 0244969

(51) Int. Cl.
*B25J 17/00* (2006.01)
*B25J 18/00* (2006.01)
*B25J 17/02* (2006.01)
*B25J 9/10* (2006.01)

(52) U.S. Cl.
CPC ................ *B25J 17/00* (2013.01); *Y10S 901/25* (2013.01); *B25J 9/103* (2013.01); *B25J 17/02* (2013.01); *Y10S 901/28* (2013.01)

(58) Field of Classification Search
CPC ........ B25J 17/0266; B25J 17/00; B25J 17/02; B25J 17/0208; B25J 17/0241; B25J 17/025; B25J 17/0258; B25J 17/0283; B25J 17/0291; B25J 9/103; B25J 9/102; B25J 9/104
USPC .......... 74/490.01, 490.05, 490.06; 901/25–29
See application file for complete search history.

(56) References Cited

U.S. PATENT DOCUMENTS

| 3,731,546 | A | * | 5/1973 | MacDonald | ...................... 74/63 |
| 5,697,256 | A | * | 12/1997 | Matteo | ........................ 74/490.04 |
| 7,806,020 | B2 | * | 10/2010 | Forslund et al. | ........... 74/490.06 |
| 8,205,305 | B2 | * | 6/2012 | Wang et al. | ...................... 16/354 |
| 8,534,155 | B2 | * | 9/2013 | Long | .......................... 74/490.06 |
| 8,714,527 | B2 | * | 5/2014 | Chen et al. | ................... 254/383 |
| 2011/0048157 | A1 | * | 3/2011 | Long et al. | ................. 74/490.03 |
| 2011/0107867 | A1 | * | 5/2011 | Long | ........................... 74/490.05 |
| 2011/0112687 | A1 | * | 5/2011 | Long | ........................... 700/264 |
| 2011/0120245 | A1 | * | 5/2011 | Long | .............................. 74/409 |

(Continued)

FOREIGN PATENT DOCUMENTS

| TW | 201122283 A1 | 7/2011 |
| TW | 201139083 A1 | 11/2011 |

*Primary Examiner* — Justin Krause
(74) *Attorney, Agent, or Firm* — Novak Druce Connolly Bove + Quigg LLP

(57) ABSTRACT

A gear transmission mechanism includes a housing, a first transmission assembly, a second transmission assembly, and a gear clearance adjustment assembly. The first transmission assembly includes an input shaft, and the second transmission assembly includes an output shaft. The gear clearance adjustment assembly includes an adjustment base mounted on the housing, fasteners, bearings, a washer, a fixing member, and a pair of freely rotatable adjusting gears for the transmission of rotative force. The adjusting gears mesh with the first and second transmission gears.

18 Claims, 3 Drawing Sheets

(56) References Cited

U.S. PATENT DOCUMENTS

| | | | |
|---|---|---|---|
| 2011/0120255 A1* | 5/2011 | Chen et al. | 74/490.06 |
| 2011/0154932 A1* | 6/2011 | Long | 74/490.01 |
| 2011/0154935 A1* | 6/2011 | Liu | 74/490.04 |
| 2011/0259137 A1* | 10/2011 | Long | 74/490.05 |
| 2011/0265597 A1* | 11/2011 | Long | 74/490.05 |
| 2012/0103127 A1* | 5/2012 | Liu | 74/490.06 |
| 2013/0081503 A1* | 4/2013 | Long | 74/490.05 |
| 2013/0125695 A1* | 5/2013 | Long | 74/490.05 |
| 2014/0013884 A1* | 1/2014 | Long | 74/406 |

\* cited by examiner

GEAR TRANSMISSION MECHANISM AND ROBOT ARM CONNECTING STRUCTURE USING THE SAME

BACKGROUND

1. Technical Field

The present disclosure generally relates to gear transmissions, and particularly, to a gear transmission mechanism and a robot arm connecting structure using the same.

2. Description of the Related Art

A robot arm connecting structure connects two robot arms, and includes a first portion, a second portion and a gear transmission mechanism connecting the first portion to the second portion. Gear transmission mechanisms provide smooth and silent transmission of rotation. A commonly-used gear transmission mechanism usually includes at least one set of gear pairs. Each gear pair includes two gears meshed with each other and respectively assembled to an input shaft and an output shaft. When assembling the gear transmission mechanism, the two gears of the gear transmission mechanism are meshed, and have a gear clearance therebetween to ensure smooth and efficient transmission, and prevent seizing of the gears during use. However, wear causes the gear clearance of the commonly-used gear transmission mechanism to become greater over time. Collisions and accompanying noises may be generated during transmissions, and these wear decrease transmission power and accuracy, and positional precision of the arm, especially in gear pairs which always rotate either clockwise or counterclockwise.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
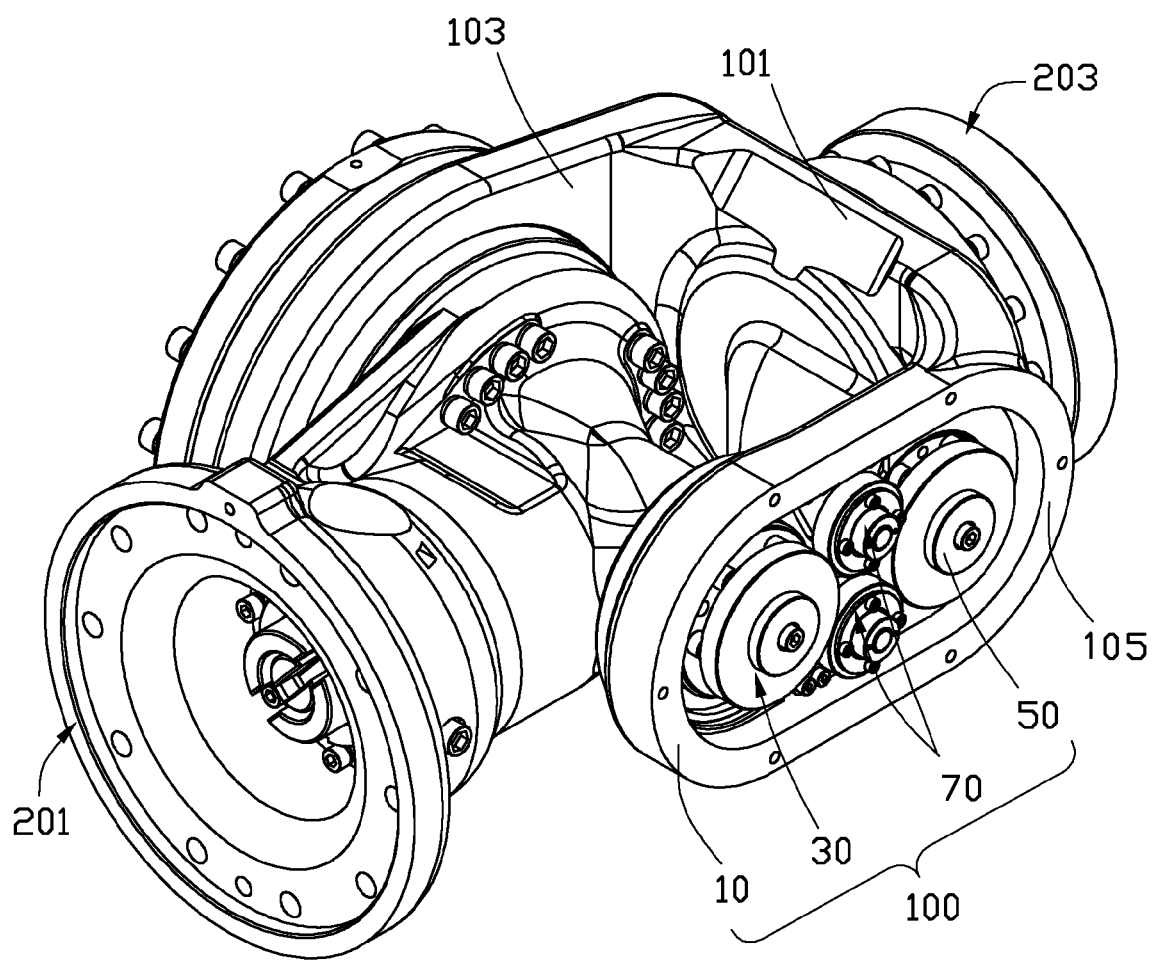
FIG. 1 shows an isometric view of a robot arm connecting structure having a gear transmission mechanism in an embodiment.
Figure 2:
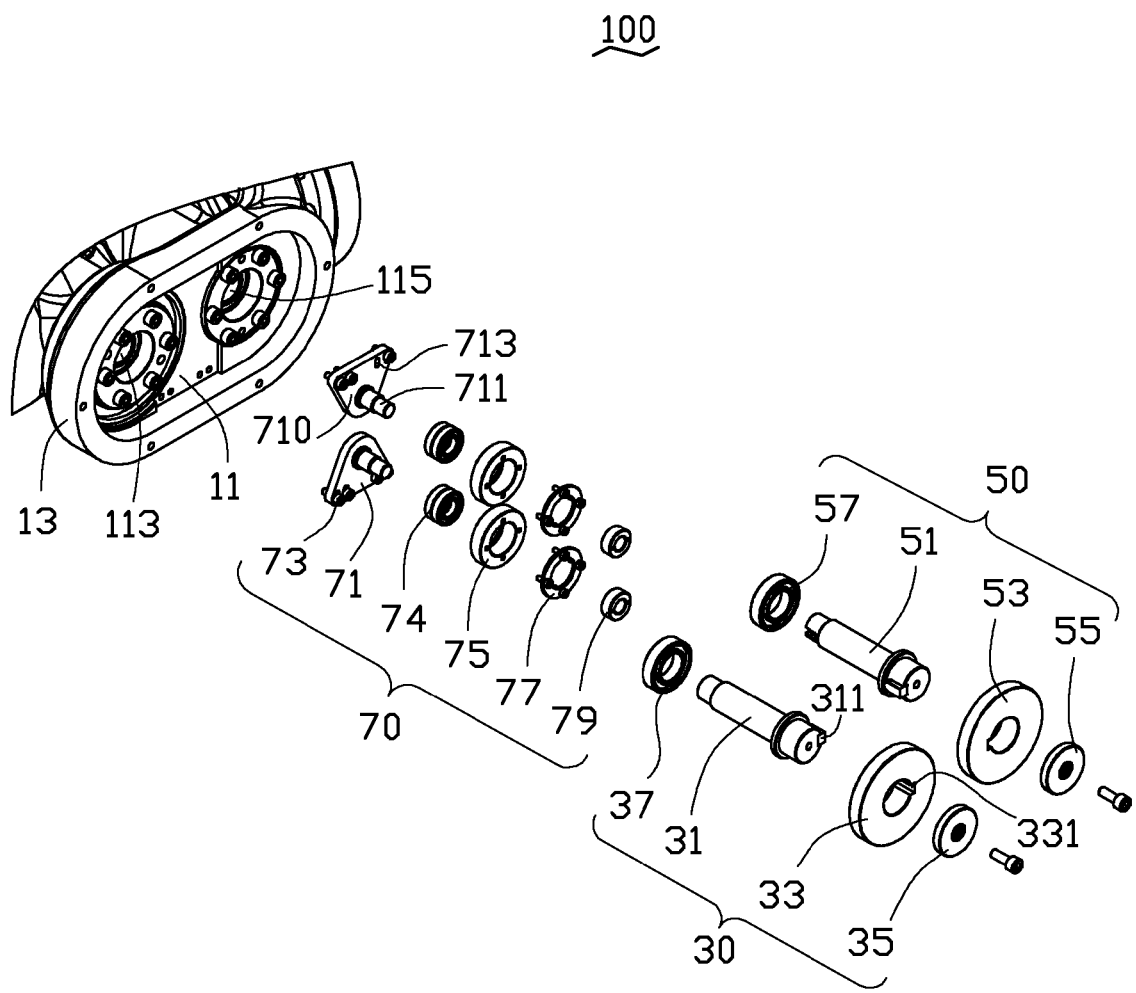
FIG. 2 is a partial, exploded, and isometric view of the gear transmission mechanism of FIG. 1.
Figure 3:
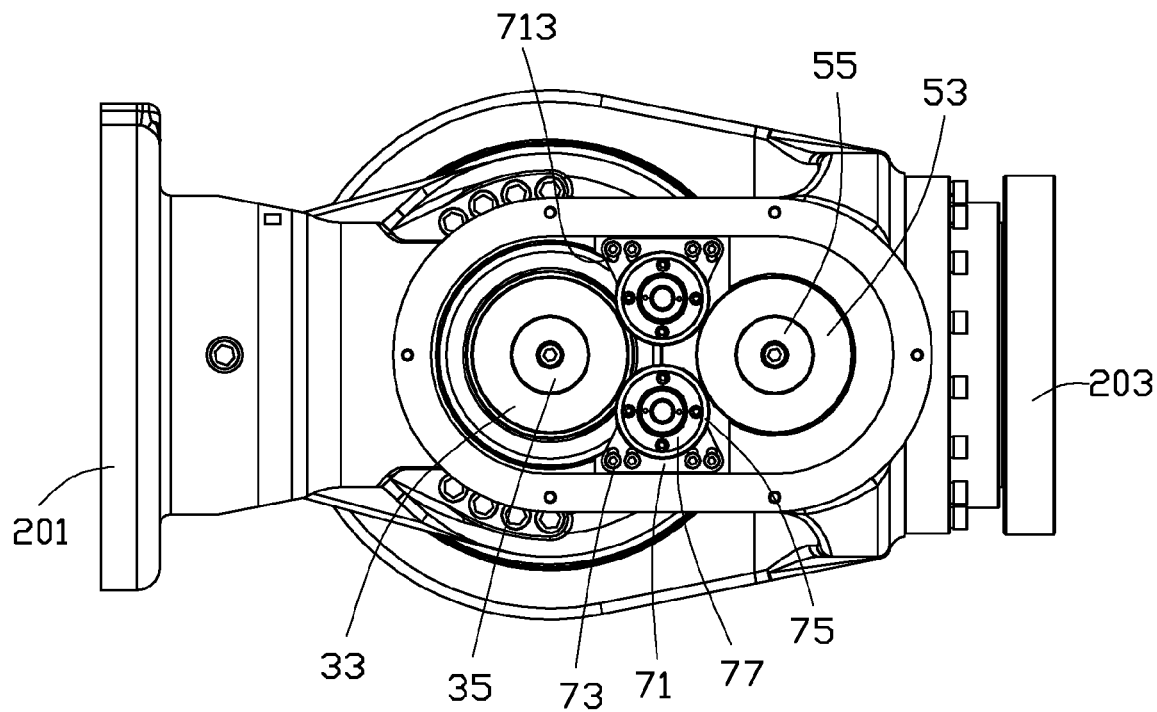
FIG. 3 shows a side view of the robot arm connecting structure of FIG. 1.

Referring to FIGS. 1 to 3, a robot arm connecting structure 200 for connecting two robot arms (not shown) is shown. The robot arm connecting structure 200 includes a first portion 201, a second portion 203, and a gear transmission mechanism 100 connecting the first portion 201 to the second portion 203. The first portion 201 and the second portion 203 can be regarded as the wrists of the robot arms. The gear transmission mechanism 100 includes a housing 10, a first transmission assembly 30, a second transmission assembly 50, and two gear clearance adjustment assemblies 70. The first, second transmission assemblies 30, 50 are positioned in the housing 10. The two gear clearance adjustment assemblies 70 are positioned in the housing 10 between the first transmission assembly 30 and the second transmission assembly 50.

The housing 10 includes a mounting portion 101, a first installation portion 103, and a second installation portion 105. The first installation portion 103 and the second installation portion 105 extend from two ends of the mounting portion 101 to form a "Y" shaped structure, the mounting portion 101 being the lowest part of the Y-shaped structure. The first portion 201 is rotatably connected to the first and second installation portions 103, 105. One side of the first installation portion 103 away from the first portion 201 is connected to a driver (not shown) for driving the first portion 201. The second installation portion 105 includes an installing wall 11 and a side wall 13, in which the sidewall 13 is located at a right angle from an edge of the installing wall 11. A first mounting hole 113 and a second mounting hole 115 are defined in the installing wall 11, and are spaced from each other. The second portion 203 is rotatably positioned on the mounting portion 101 opposite to the first portion 201.

The first, second transmission assemblies 30, 50 are rotatably positioned on the installing wall 11, and are spaced from each other. The first transmission assembly 30 is connected to the first portion 201, and the second transmission assembly 50 is connected to the second portion 203. The first transmission assembly 30 includes an input shaft 31, a first transmission gear 33, a first pressing member 35, and a first bearing 37. A key portion 311 protrudes from a side surface of one end of the input shaft 31. The input shaft 31 passes through the first mounting hole 113 and the end thereof having the key portion 311 of the input shaft 31, and protrudes out from the first mounting hole 113. The other end of the input shaft 31 is rotatably connected to the first portion 201 by a pair of gears (not shown). The first transmission gear 33 is sleeved on the output shaft 31. A key groove 331 is formed in the first transmission gear 33 corresponding to and engaging with the key portion 311, for fixing the first transmission gear 33 on the input shaft 31. The first pressing member 35 is substantially ring-shaped, and sleeves on the input shaft 31 above the first transmission gear 33. The first bearing 37 sleeves on the input shaft 31, and is received in the first mounting hole 113. The input shaft 31 is driven to rotate by the first portion 201 and thus rotates the first transmission gear 33. The first transmission gear 33 is positioned between the first bearing 37 and the first pressing member 35.

The second transmission assembly 50 has a structure similar to that of the first transmission assembly 30. The second transmission assembly 50 includes an output shaft 51, a second transmission gear 53, a second pressing member 55, and a second bearing 57. The output shaft 51, which is substantially identical to the input shaft 31, passes through the second mounting hole 115 and extends out of the second mounting hole 115 to be fixedly-connected to the second transmission gear 53. The other end of the output shaft 51 is rotatably-connected to the second portion 203. The second pressing member 55 sleeves on the output shaft 51 above the second transmission gear 53. The second bearing 57 sleeves on the output shaft 51 and is received in the second mounting hole 115. The second transmission gear 53 is positioned between the second bearing 57 and the second pressing member 55.

The two gear clearance adjustment assemblies 70 are positioned towards opposite sides of the installing wall 11, at between the first transmission assembly 30 and the second transmission assembly 50. Each gear clearance adjustment assembly 70 includes an adjustment base 71, four fasteners 73, two bearings 74, an adjusting gear 75, a washer 77, and a fixing member 79. Two adjustment bases 71 of the two gear clearance adjustment assemblies 70 are symmetrically positioned on the installing wall 11 about or perpendicular to a line between the center of the first transmission gear 33 and the center of the second transmission gear 53.

The adjustment base 71 positioned on the installing wall 11 includes a main body 710 and a rotation shaft 711. The substantially triangular main body 710 is mounted on the installing wall 11, and the rotation shaft 711 protrudes straight out from one corner of the main body 710. A rotation axis of each rotation shaft 711 is substantially parallel to the rotation axes of the first, second transmission gears 33, 53. Two adjustment holes 713 are defined in each of the other two corners of the main body 71 spaced from each other. Each fastener 73 passes through one adjustment hole 713 to mount the adjustment base 71 on the installing wall 11. A width of the adjustment hole 713 along a direction substantially perpendicular to the rotation axis of each rotation shaft 711 is slightly greater than a diameter of the fastener 73, such that positions of the adjustment bases 71 relative to the first, second transmission gears 33, 53 on the installing wall 11 are adjustable.

The adjusting gear 75 rotatably sleeves on the rotation shaft 711 on one bearing 74, and meshes with the first transmission gear 33 and the second transmission gear 53. The washer 77 sleeves on the rotation shaft 711 above the adjusting gear 75 away from the adjustment base 71. The fixing member 79 sleeves on the rotation shaft 711 above the adjusting gears 75 to prevent the adjusting gear 75 detaching from the adjustment base 71. Gear clearances between one adjusting gear 75 and the first transmission gear 33, and between the other one adjusting gear 75 and the second transmission gear 53 are adjustable, respectively, by changing the positions of the adjustment bases 71 relative to the first, second transmission gears 33, 53 on the installing wall 11.

When the robot arm connecting structure 200 is in operation, the first transmission gear 33 is driven to rotate by the input shaft 31. The two adjusting gears 75 of the two gear clearance adjustment assemblies 70 are also driven to rotate with the first transmission gear 33, such that the output shaft 51 is rotated together with the two adjusting gears 75. When gear clearances between each adjusting gear 75 and the first transmission gear 33, and between each adjusting gear 75 and the second transmission gear 53 become excessive, respectively, because of wear during usage, which thereby negatively affecting the operation properties of the robot arms, as a result, to overcome such excessive gear clearance issues, the positions of the adjustment bases 71 relative to the first, second transmission gears 33, 53 are adjustable to cancel excessive gear clearances.

The two gear clearance adjustment assemblies 70 are positioned on the installing wall 11 between the first transmission assembly 30 and the second transmission assembly 50, a line formed between the two adjustment assemblies 70 is perpendicular to a line formed between the first, second tranmission assemblies 30 and 50. The gear clearances can be adjusted by loosening the fasteners 73 in the adjustment hole 713 and adjusting positions of the adjustment bases 71 relative to the first, second transmission gears 33, 53 and re-tightening the fasteners 73, such that the gear teeth of the first, second transmission gears 33, 53 are kept from collisions and jumping out of mesh, and thus the corresponding noise produced between the first, second transmission gear 33, 53 and the two adjusting gears 75 is thereby minimized.

The number of gear clearance adjustment assembly 70 can be changed as needed.

The number of adjustment holes 713 of each adjustment base 71 can be changed as needed. The number of the fasteners 73 corresponds to the number of adjustment holes 713.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A gear transmission mechanism, comprising:
    a housing;
    a first transmission assembly positioned in the housing, the first transmission assembly comprising:
        an input shaft positioned in the housing; and
        a first transmission gear sleeving on the input shaft;
    a second transmission assembly positioned in the housing and separated from the first transmission assembly, the second transmission assembly comprising:
        an output shaft positioned in the housing; and
        a second transmission gear sleeving on the output shaft; and
    a gear clearance adjustment assembly positioned in the housing between the first transmission assembly and the second transmission assembly, the gear clearance adjustment assembly comprising:
        an adjustment base mounted on the housing, the adjustment base defining an adjustment hole;
        a fastener passing through the adjustment hole and the housing to fix the adjustment base on the housing; and
        an adjusting gear rotatably positioned on the adjustment base, and the adjusting gear meshing with the first transmission gear and the second transmission gear, wherein a width of the adjustment hole along a direction substantially perpendicular to the rotation axis of the adjusting gear is greater than a diameter of the fastener, thereby the adjustment base is adjustably mounted on the housing, clearances between the adjustment gear and the first transmission gear, and between the adjustment gear and the second transmission gear, are adjustable by changing positions of the adjustment base along an axis perpendicular to a line of centers of the first transmission gear and the second transmission gear.

2. The gear transmission mechanism of claim 1, wherein the adjustment base comprises a main body and a rotation shaft protruding from the main body, the main body is mounted on the housing, the adjustment hole is defined in the main body, and the adjusting gear rotatably sleeves on the rotation shaft.

3. The gear transmission mechanism of claim 2, wherein the adjustment base is substantially a triangular board, the rotation shaft is positioned at a corner of the main body.

4. The gear transmission mechanism of claim 2, wherein the gear clearance adjustment assembly further comprises a fixing member sleeving on the rotation shaft above the adjusting gear.

5. The gear transmission mechanism of claim 1, wherein the input shaft forms a key portion, a key groove is formed in the first transmission gear, and the key portion engages with the key groove.

6. The gear transmission mechanism of claim 1, wherein the first transmission assembly further comprises a first pressing member sleeving on the input shaft above the first transmission gear.

7. The gear transmission mechanism of claim 1, wherein the housing comprises a mounting portion, a first installation portion, and a second installation portion, the first installation portion and the second installation portion extend from two ends of the mounting portion, the input shaft and the output shaft pass through and protrude out from the mounting portion, and the adjustment base is mounted on the second installation portion away from the first installation portion.

8. The gear transmission mechanism of claim 7, wherein the second installation portion comprises an installing wall and a side wall located at a right angle from an edge of the installing wall, a first mounting hole and a second mounting hole are defined in the installing wall and are spaced from each other, the input shaft passes through and protrudes out from the first mounting hole, the output shaft passes through and protrudes out from the second mounting hole.

9. The gear transmission mechanism of claim 8, wherein the first transmission assembly further comprises a first bearing sleeving on the input shaft and received in the first mounting hole.

10. A robot arm connecting structure, comprising:
a gear transmission mechanism, comprising:
  a housing;
  a first transmission assembly positioned in the housing, the first transmission assembly comprising:
    an input shaft positioned in the housing; and
    a first transmission gear sleeving on the input shaft;
  a second transmission assembly positioned in the housing and separated from the first transmission assembly, the second transmission assembly comprising:
    an output shaft positioned in the housing; and
    a second transmission gear sleeving on the output shaft; and
  a gear clearance adjustment assembly positioned in the housing between the first transmission assembly and the second transmission assembly, the gear clearance adjustment assembly comprising:
    an adjustment base mounted on the housing, the adjustment base defining an adjustment hole;
    a fastener passing through the adjustment hole and the housing to fix the adjustment base on the housing; and
    an adjusting gear rotatably positioned on the adjustment base, and the adjusting gear meshing with the first transmission gear and the second transmission gear;
a first portion rotatably connected with the input shaft; and
a second portion rotatably connected with the output shaft, wherein a width of the adjustment hole along a direction substantially perpendicular to the rotation axis of the adjusting gear is greater than a diameter of the fastener, thereby the adjustment base is adjustably mounted on the housing, clearances between the adjustment gear and the first transmission gear, and between the adjustment gear and the second transmission gear, are adjustable by changing positions of the adjustment base along an axis perpendicular to a line of centers of the first transmission gear and the second transmission gear.

11. The robot arm connecting structure of claim 10, wherein the adjustment base comprises a main body and a rotation shaft protruding from the main body, the main body is mounted on the housing, the adjustment hole is defined in the main body, and the adjusting gear rotatably sleeves on the rotation shaft.

12. The robot arm connecting structure of claim 11, wherein the adjustment base is substantially a triangular board, the rotation shaft is positioned at a corner of the main body.

13. The robot arm connecting structure of claim 12, wherein the gear clearance adjustment assembly further comprises a fixing member sleeving on the rotation shaft above the adjusting gear.

14. The robot arm connecting structure of claim 10, wherein the input shaft forms a key portion, a key groove is formed in the first transmission gear, and the key portion engages with the key groove.

15. The robot arm connecting structure of claim 10, wherein the first transmission assembly further comprises a first pressing member sleeving on the input shaft above the first transmission gear.

16. The robot arm connecting structure of claim 10, wherein the housing comprises a mounting portion, a first installation portion, and a second installation portion, the first installation portion and the second installation portion extend from two ends of the mounting portion by bending, the input shaft and the output shaft pass through and protrude out from the mounting portion, and the adjustment base is mounted on the second installation portion away from the first installation portion.

17. The robot arm connecting structure of claim 16, wherein the second installation portion comprises an installing wall and a side wall extending from an edge of the installing wall by bending, a first mounting hole and a second mounting hole are defined in the installing wall and are spaced from each other, the input shaft passes through and protrudes out from the first mounting hole, the output shaft passes through and protrudes out from the second mounting hole.

18. The robot arm connecting structure of claim 17, wherein the first transmission assembly further comprises a first bearing sleeving on the input shaft and received in the first mounting hole.

* * * * *